(12) United States Patent
Huang et al.

(10) Patent No.: US 9,063,262 B2
(45) Date of Patent: Jun. 23, 2015

(54) LIGHTGUIDE DESIGN TECHNIQUES

(75) Inventors: Qiong Huang, Winchester, MA (US); Ming Li, Acton, MA (US); Yi Yang, Peabody, MA (US); Joseph A. Olsen, Gloucester, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 370 days.

(21) Appl. No.: 13/597,445

(22) Filed: Aug. 29, 2012

(65) Prior Publication Data

US 2014/0064660 A1 Mar. 6, 2014

(51) Int. Cl.
*F21V 8/00* (2006.01)

(52) U.S. Cl.
CPC .................................... *G02B 6/0036* (2013.01)

(58) Field of Classification Search
CPC ............... G02B 6/10; G02B 6/26; G06G 7/48
USPC ...................................................... 385/31–37
See application file for complete search history.

(56) References Cited

U.S. PATENT DOCUMENTS

| 6,215,936 | B1 * | 4/2001 | Yoshikawa et al. | 385/133 |
| 6,259,854 | B1 * | 7/2001 | Shinji et al. | 385/146 |
| 2009/0237399 | A1 * | 9/2009 | Bailey | 345/420 |
| 2011/0227487 | A1 * | 9/2011 | Nichol et al. | 315/158 |
| 2013/0317784 | A1 * | 11/2013 | Huang et al. | 703/1 |
| 2014/0049983 | A1 * | 2/2014 | Nichol et al. | 362/610 |
| 2014/0056028 | A1 * | 2/2014 | Nichol et al. | 362/611 |
| 2014/0063853 | A1 * | 3/2014 | Nichol et al. | 362/616 |
| 2014/0126239 | A1 * | 5/2014 | Huang et al. | 362/609 |

\* cited by examiner

*Primary Examiner* — Akm Enayet Ullah
(74) *Attorney, Agent, or Firm* — Andrew Martin

(57) ABSTRACT

Techniques are disclosed for obtaining a desired luminance and/or intensity distribution from any lighting fixture that is illuminated by a lightguide. The techniques can be used, for instance, to design a non-uniform surface texture (e.g., of light extraction features) for a lightguide, wherein the surface texture achieves a desired uniform or an intentionally non-uniform luminance distribution for a given lightguide shape/geometry, dimensions, and/or composition. In some embodiments, an iteration algorithm with illuminance distribution feedback is utilized to design a non-uniform surface texture (e.g., geometry, dimensions, quantity and/or spatial distribution of light extraction features) to achieve the target luminance distribution for a given lighting application.

12 Claims, 5 Drawing Sheets

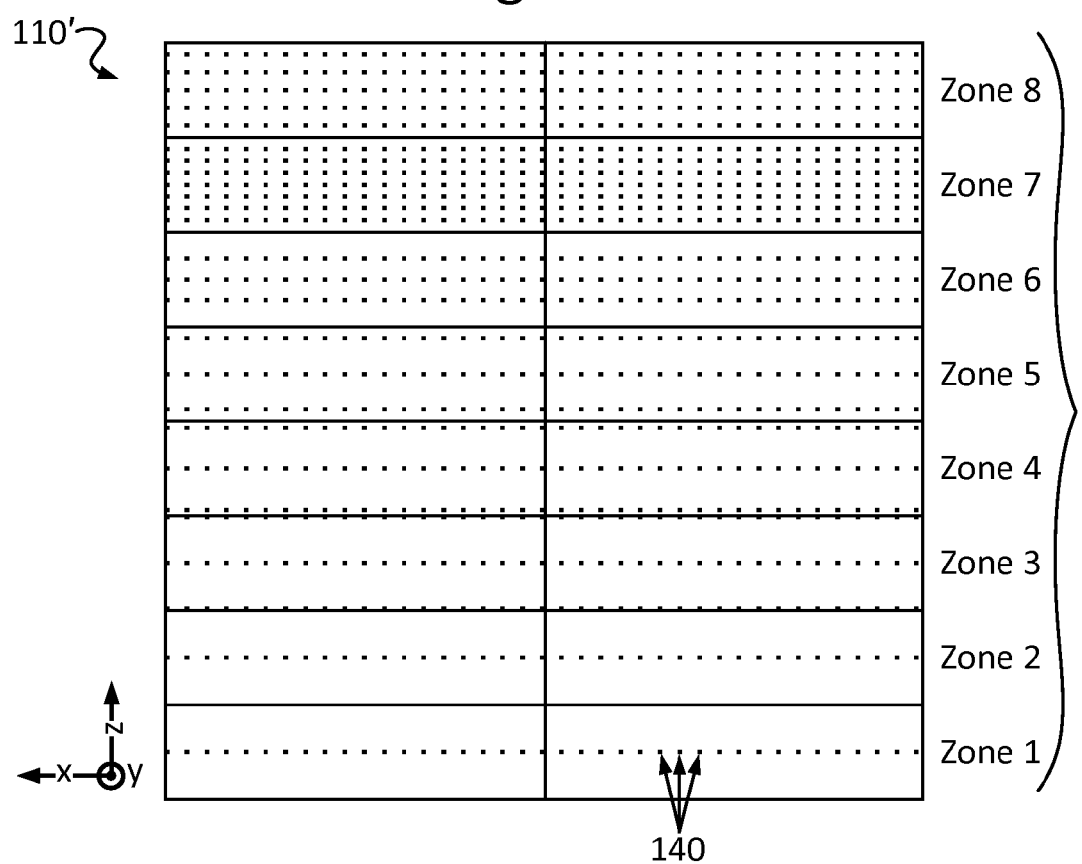

Current X Slice (mm)

Current Y Slice (mm)

LIGHTGUIDE DESIGN TECHNIQUES

FIELD OF THE DISCLOSURE

The invention relates to lightguide design techniques and resulting lighting fixtures.

BACKGROUND

Light emitting diode (LED)-based lighting design involves a number of non-trivial challenges, and edge-lit LED fixtures have faced particular complications, such as those with respect to achieving and/or maintaining suitable lit appearance.

BRIEF DESCRIPTION OF THE DRAWINGS

FIG. 4 is a perspective view of a lightguide configured with a non-uniform distribution of light extraction features in accordance with an embodiment of the present invention.

The accompanying drawings are not intended to be drawn to scale.

DETAILED DESCRIPTION

Techniques are disclosed for obtaining a desired luminance and/or intensity distribution from any lighting fixture that is illuminated by a lightguide. The techniques can be used, for instance, to design a non-uniform surface texture (e.g., of light extraction features) for a lightguide, wherein the surface texture achieves a desired uniform or an intentionally non-uniform luminance distribution for a given lightguide shape/geometry, dimensions, and/or composition. In some embodiments, an iteration algorithm with illuminance distribution feedback is utilized to design a non-uniform surface texture (e.g., geometry, dimensions, quantity and/or spatial distribution of light extraction features) to achieve the target luminance distribution for a given lighting application. The resultant fixtures have a broad range of applications, such as in office lighting, commercial lighting, signage lighting, and/or display backlighting applications, and may exhibit relatively high optical efficiency. Numerous configurations and variations will be apparent in light of this disclosure.

General Overview

Figure 1A:
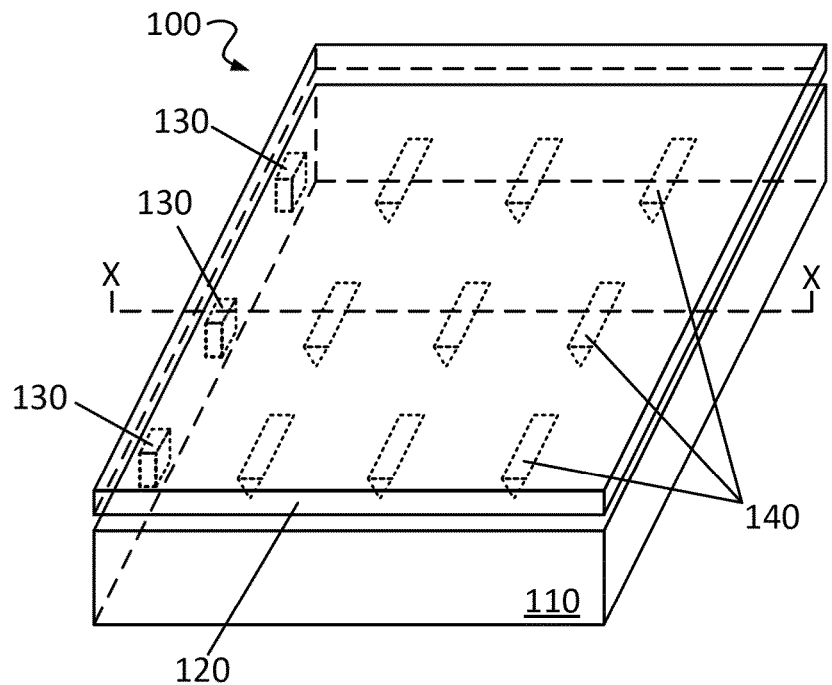
FIG. 1A is a perspective view of an example edge-lit panel/fixture.
Figure 1B:
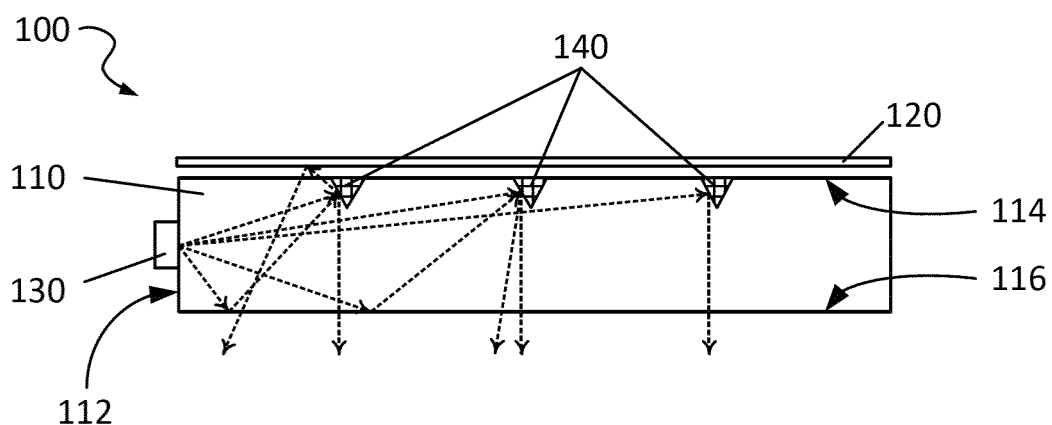
FIG. 1B is a cross-section view of the edge-lit panel/fixture of FIG. 1A taken along dashed line X-X therein.

FIG. 1A is a perspective view of an example edge-lit panel/fixture 100, and FIG. 1B is a cross-section view of the edge-lit panel/fixture 100 of FIG. 1A taken along dashed line X-X therein. As can be seen, the example edge-lit panel/fixture 100 comprises a lightguide 110, an optionally included back reflector 120 disposed proximate back surface 114 of lightguide 110, and one or more LED light sources 130 operatively coupled to an input surface 112 of lightguide 110. In some cases, lightguide 110 may have on one or more of its surfaces (e.g., back surface 114 and/or output surface 116) a surface texture formed by a plurality of light extraction features 140 (e.g., structures/materials configured to reflect, refract, absorb, etc., incident light). As will be appreciated in light of this disclosure, a given edge-lit panel/fixture 100 may include additional, fewer, and/or different elements or components from those here described (e.g., diffusers, brightness enhancement films, polarizers, etc.), and the claimed invention is not intended to be limited to implementation with any particular edge-lit panel/fixture configurations, but can be used with numerous configurations in numerous applications.

Lightguide 110 may comprise an optical material chosen, at least in part, based on its ability to: (1) be configured for total internal reflection (TIR) of at least a portion of the light provided by the one or more LED light sources 130; and/or (2) transmit/emit the wavelength(s) of interest (e.g., visible, ultraviolet, infrared, etc.) of the light provided by the one or more LED light sources 130. For example, lightguide 110 may comprise a material such as, but not limited to: (1) a transparent polymer such as poly(methyl methacrylate) (PMMA), polycarbonate, etc.; (2) a transparent ceramic such as sapphire ($Al_2O_3$), yttrium aluminum garnet (YAG), etc.; and/or (3) a transparent glass. Also, in some cases, lightguide 110 optionally may have one or more optical and/or protective coatings (e.g., anti-reflective; diffractive; etc.) disposed thereon.

The geometry of lightguide 110 may be customized for a given application; for example, lightguide 110 may be configured as: (1) a planar structure (e.g., a square/rectangular plate, a circular plate, an elliptical plate, etc.); (2) a curved/non-planar structure (e.g., a three-dimensional structure having at least one curved/non-planar surface); and/or (3) any other lightguide configuration/structure. In the specific example case depicted in FIGS. 1A and 1B, lightguide 110 is substantially configured as a square/rectangular plate having, among others, an input surface 112, a back surface 114, and an output surface 116. Furthermore, the dimensions (e.g., length, width, height, etc.) of lightguide 110 may be customized for a given application. For instance, in one specific example case, lightguide 110 may be dimensioned for implementation within a 2 ft.×2 ft. edge-lit panel/fixture 100, while in other example cases, lightguide 110 may be configured for implementation in edge-lit panels/fixtures 100 of smaller or larger area (e.g., in the range of a few micrometers to hundreds of meters or greater). Other suitable configurations and/or materials for lightguide 110 will depend on a given application and will be apparent in light of this disclosure.

Light may be extracted (e.g., by the one or more light extraction features 140, discussed in detail below) from lightguide 110 and directed towards/through: (1) output surface 116; and/or (2) back surface 114. As will be appreciated, permitting light to be extracted and emitted through back surface 114 may be undesirable for some applications (e.g., ceiling lighting applications). In such cases, a back reflector 120 can be used to reflect/redirect at least a portion (e.g., substantially all) of the extracted light (e.g., which otherwise would escape lightguide 110 through back surface 114 if not for back reflector 120) back towards/through output surface 116. Therefore, substantially all of the extracted light, regardless of initial direction of extraction by light extraction features 140, may be made to pass through output surface 116 of lightguide 110. When included, it may be desirable to ensure that back reflector 120 is implemented sufficiently proximate to back surface 114 (e.g., such that the gap there between is in the range of a few micrometers to a few millimeters) to ensure a sufficient amount of reflection. However, as will be appreciated in light of this disclosure, there may be some cases in which it is desirable to permit light to be extracted and emitted, for example, through both of back surface 114 and output surface 116, and so back reflector 120 accordingly may be omitted from edge-lit panel/fixture 100.

Back reflector 120 may comprise, for example, a highly reflective metal film/layer such as aluminum, gold, silver, etc., that is chosen, at least in part, based on its ability to reflect the wavelength(s) of interest of the light (e.g., visible, ultraviolet, infrared, etc.) provided by the one or more LED light sources 130. Also, much like with lightguide 110, the configuration of back reflector 120 may be customized for a given application. For example, back reflector 120 may be configured to conform to the shape of or otherwise complement: (1) a planar structure (e.g., a square/rectangular plate, a circular plate, an elliptical plate, etc.); (2) a curved/non-planar structure (e.g., a three-dimensional structure having at least one curved/non-planar surface); and/or (3) any other lightguide configuration/structure.

To this end, further note that the dimensions (e.g., length, width, height, thickness, etc.) of back reflector 120, when included, may be customized for a given application. For instance, in one specific example case, back reflector 120 may be dimensioned, like lightguide 110, for implementation in a 2 ft.×2 ft. edge-lit panel/fixture 100, while in other example cases, back reflector 120 may be configured for implementation in edge-lit panels/fixtures 100 of smaller or larger area (e.g., in the range of a few micrometers to hundreds of meters or greater). In some cases, back reflector 120 may be dimensioned similarly to back surface 114 (e.g., substantially similar/identical areas at the interface between back surface 114 and back reflector 120) to ensure that a minimal amount of light (e.g., substantially no light or an otherwise acceptable amount) escapes through back surface 114. Other suitable configurations and/or materials for back reflector 120 will depend on a given application and will be apparent in light of this disclosure.

As can further be seen, edge-lit panel/fixture 100 may include one or more LED light sources 130 configured, for example, to deliver/emit light into lightguide 110 (e.g., from input surface 112 thereof). In some cases, the one or more LED light sources 130 may be: (1) physically coupled, for example, with input surface 112; and/or (2) disposed proximate to, but separate from, for example, input surface 112. The one or more LED light sources 130 may be of any type (e.g., surface emitting, color independent, etc.), dimensions (e.g., greater than or equal to about 0.001 mm), and/or spectral emission band (e.g., visible spectral band, infrared spectral band, ultraviolet spectral band, etc.) suitable for a given application. Other suitable configurations for the one or more LED light sources 130 will depend on a given application and will be apparent in light of this disclosure.

As previously discussed, lightguide 110 may implement on one or more of its surfaces (e.g., back surface 114 and/or output surface 116) a surface texture (e.g., a pattern/distribution of light extraction features 140) which is configured to extract light from within lightguide 110 (e.g., such as by reflection, refraction, absorption, etc.). In some instances, one or more light extraction features 140 may comprise, for example, a substantially two-dimensional feature, such as a dot or other quantity of material (e.g., a reflective paint, a phosphor, a liquid such as oil or water, etc.). In some other instances, one or more light extraction features 140 may comprise, for example, a three-dimensional feature, such as, but not limited to: (1) a structure comprising a material of different refractive index from that of lightguide 110 (e.g., a ceramic, a metal, air, etc.); (2) a formation in a surface of lightguide 110 (e.g., a void, vacuum, hole, hollow, depression, etc., formed within a given surface of lightguide 110); and/or (3) a formation on a surface of lightguide 110 (e.g., a bump, protrusion, projection, etc., formed on a given surface of lightguide 110). In some cases, a given three-dimensional light extraction feature 140 may be configured with a geometry, for example, like that of a sphere, cylinder, cone, conical frustum, pyramid, pyramidal frustum, polyhedron, etc. For a given surface (e.g., back surface 114, output surface 116, etc.), light extraction features 140 may be internal and/or external to the confines/volume of lightguide 110.

As will be appreciated in light of this disclosure, light provided by the one or more LED light sources 130 is coupled into lightguide 110, within which the light may reflect several times due to TIR, until it is incident to and extracted by one or more of the light extraction features 140. As can be seen with particular reference to FIG. 1B, light which is incident to a given light extraction feature 140 may be redirected, for example, towards output surface 116 and/or towards back surface 114 (e.g., in which case a back reflector 120, if implemented, may reflect/redirect the light back towards output surface 116, as previously discussed).

However, as will be appreciated in light of this disclosure, traditional approaches to lightguide surface texture design (e.g., a simple uniform and/or linear pattern/distribution of light extraction features 140) do not provide a sufficiently uniform luminance distribution and/or color distribution for use, for example, in most lighting applications (e.g., office lighting, commercial lighting, signage lighting, display backlighting, etc.). This may be, at least in part, because the light intensity provided by LED light sources 130 is typically non-uniform and non-linear.

Furthermore, as previously indicated, there are a number of non-trivial issues that can arise which complicate obtaining and maintaining a good lit appearance (uniform luminance and color distribution), for example, in lighting panels/fixtures. For instance, consider a 2 ft.×2 ft. edge-lit LED lighting panel/fixture which, in an attempt to obtain uniform luminance and color distribution, normally would require a high LED density (e.g., greater than or equal to about 100 OSLON LEDs for the 2 ft.×2 ft. fixture/panel) or a large color mixing chamber in the light engine design. However, these design approaches tend to increase system cost and/or restrict the mechanical design of the lighting panel/fixture.

There exist a number of techniques/designs which can be implemented in an attempt to obtain a degree of uniform luminance distribution for large edge-lit LED-based lighting fixtures, but these techniques are generally inadequate for various applications. For instance, some commercially available software/programs (e.g., the Backlight Pattern Optimization, or BPO, module of LightTools® from Synopsys, Inc.) may be utilized, for example, to design micro-feature distributions for lightguides for backlights. However, the optimization capabilities of such software/programs are intrinsically limited due to the very large parameter space attendant such designs (e.g., micro-feature size, shape, type, etc.). Furthermore, while such programs/software may provide acceptable optimization results when the initial values are similar to the optimized values for relatively simple target functions, non-uniform luminance distribution implicates more complicated target functions which are difficult/impossible to define in such programs/software.

Also, there exist some algorithms which achieve uniform luminance for LCD and LED TV backlights, including: (1) trial and error (hard prototyping); (2) Fuzzy logic; (3) regional partition approach; (4) genetic algorithms; (5) neural network; and (6) molecular dynamics. However, while these algorithms may provide suitable uniformity in the specific context of LCD and LED TV backlights, their low optical efficiencies (40-65%) are unacceptable for lighting applications. Another existing approach involves implementation of diffusers to improve uniformity of luminance distribution. However, such diffusion techniques inherently reduce optical efficiency, which make their implementation unattractive for lighting applications.

Figure 2A:
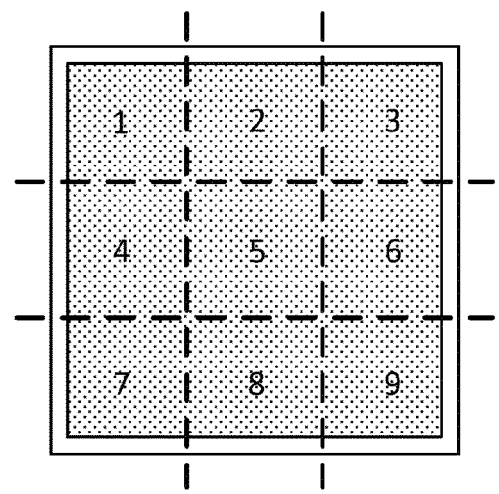
FIG. 2A illustrates a schematic front view of an example 2 ft.×2 ft. edge-lit light emitting diode (LED) lighting panel utilizing a lightguide.
Figure 2B:
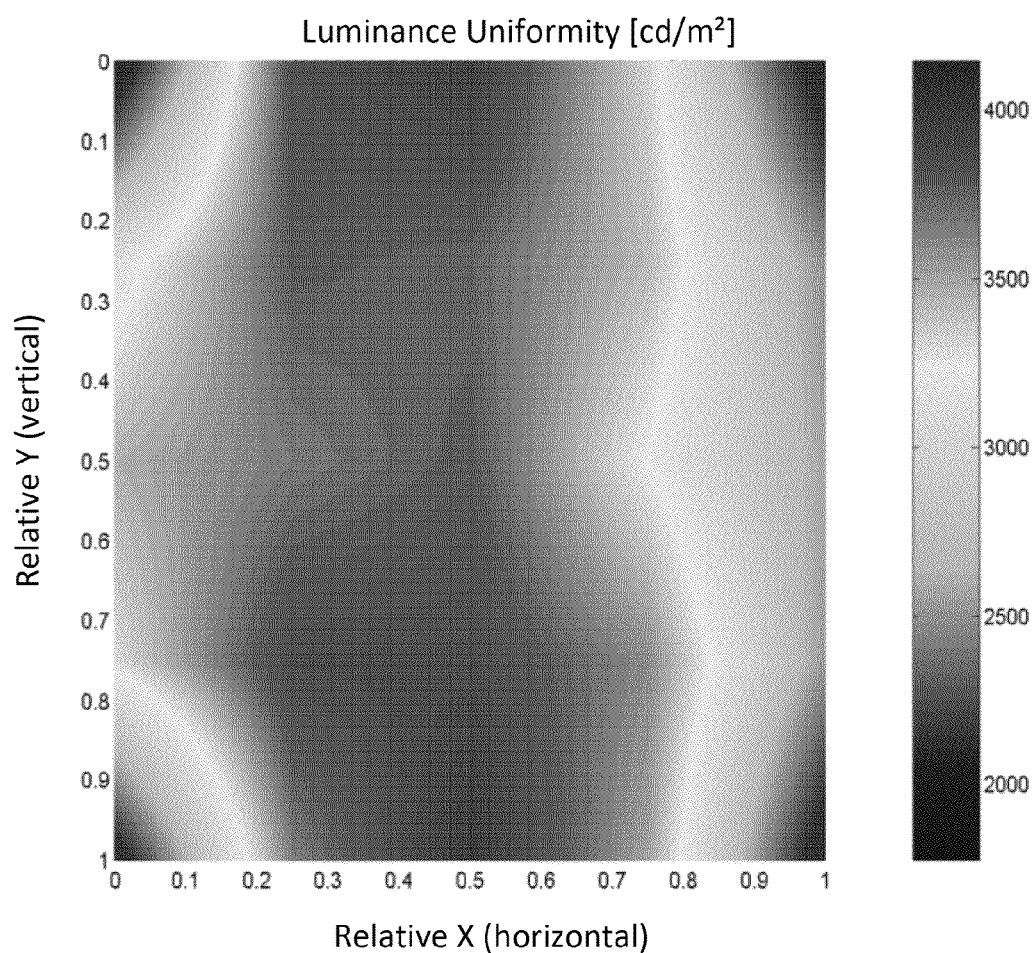
FIG. 2B illustrates luminance uniformity for the example edge-lit LED lighting panel of FIG. 2A.

There exist some edge-lit LED lighting panel/fixture products that utilize non-uniform surface textures originally designed specifically for display or LCD TV backlights in an attempt to provide suitably uniform luminance distribution for lighting applications. For example, consider FIG. 2A, which illustrates a schematic front view of an example 2 ft.×2 ft. edge-lit LED lighting panel utilizing a lightguide designed by Global Lighting Technologies, Inc. As can be seen from FIG. 2B, which illustrates luminance uniformity for the example edge-lit LED lighting panel of FIG. 2A, the optical efficiency thereof is less than 64% and the luminance uniformity thereof is less than 65%, as determined, for example, by a 9-point uniformity test (e.g., 10% from the edge and the middle point) based on 25 locations measured and interpolation. As previously noted, such low optical efficiency is generally unacceptable for lighting applications.

Therefore, there is need for a way of obtaining a suitably uniform luminance distribution, for example, in an edge-lit LED-based lighting fixture/panel, while achieving sufficiently high optical efficiency, minimizing/eliminating mechanical design constraints, and/or minimizing cost.

Thus, and in accordance with an embodiment of the present invention, techniques are disclosed for obtaining a desired luminance distribution from any edge-lit LED-based lighting panel/fixture (e.g., edge-lit panel/fixture 100) that is illuminated by a lightguide (e.g., lightguide 110) having a surface texture comprising a plurality of light extraction features (e.g., light extraction features 140) on one or more of its surfaces (e.g., back surface 114 and/or output surface 116). As will be appreciated in light of this disclosure, and in accordance with an embodiment, techniques disclosed herein may be implemented to provide a spatially non-uniform surface texture of light extraction features 140 on an internal and/or external surface (e.g., the inside and/or the outside of back surface 114 and/or output surface 116) of a lightguide (e.g., lightguide 110), wherein the spatially non-uniform surface texture balances the non-uniform light intensity provided by the one or more LED light sources 130 to achieve a desired luminance distribution, which may be uniform or intentionally non-uniform.

A surface texture configured in accordance with an embodiment of the present invention can be implemented with any given plurality of light extraction features 140 regardless of their dimensions (e.g., greater than or equal to about 2 μm), geometry (e.g., two-dimensional and/or three-dimensional), and quantity. Also, such a surface texture can be implemented regardless of the type/configuration of the one or more LED light sources 130, of the shape/geometry (e.g., rectangular, square, circular, elliptical, planar, non-planar, curved, three-dimensional, etc.) and dimensions (e.g., having dimensions on the order of a few micrometers to hundreds of meters or greater) of lightguide 110, and of whether a back reflector 120 is optionally included.

An iteration algorithm is disclosed which, in accordance with an embodiment, can be used to design a surface texture (e.g., a configuration of light extraction features 140) for a given lightguide 110 which achieves, as desired: (1) a uniform luminance distribution from a lightguide 110; and/or (2) an intentionally non-uniform luminance distribution from a lightguide 110. Furthermore, in accordance with an embodiment, results generated by the iteration algorithm can be interpreted to determine whether and/or how to adjust a given surface texture to achieve the desired luminance distribution. For instance, to achieve a desired luminance distribution, changes may be made to one or more of the following variables associated with the light extraction features 140 comprising the surface texture: (1) feature distribution (e.g., density, pattern/periodicity, etc.); (2) feature geometry (e.g., shape, radius, angle, etc.); (3) feature size; (4) feature material/composition; and/or (5) any other feature parameters which affect light extraction. Thus, in some embodiments, the disclosed iteration algorithm can be used with luminance distribution feedback to design a lightguide 110 surface texture optimized for a given set of: (1) design constraints (e.g., componentry parameters for lightguide 110, back reflector 120, LED light sources 130, etc.); and/or (2) application/end use parameters (e.g., location, orientation, photometric criteria, performance requirements, etc.).

Furthermore, as will be appreciated in light of this disclosure, the disclosed iteration algorithm is not intended to be limited for use only with luminance feedback and adjustments. For instance, and in accordance with an embodiment, iteration feedback may be provided by a wide variety of light distribution parameters including, but not limited to, one or a combination of spatial distribution and/or angular distribution, for example, of luminance, illuminance, luminous intensity, color, color temperature, color rendering index (CRI), or other light properties, at near-field and/or far-field. Adjustments to one or more of such characteristics may be made, in accordance with an embodiment, as desired for a given application.

As previously noted, some embodiments of the present invention may be implemented, for example, to produce a lighting fixture having a desired uniform and/or intentionally non-uniform luminance distribution from a given lightguide 110 configured with light extraction features 140 on one or more of its back surface 114 and/or output surface 116. However, the claimed invention is not so limited; for instance, some embodiments of the present invention may be implemented, for example: (1) to obtain one or more non-emitting regions on an output surface 116 and/or a back surface 114 of a lightguide 110; (2) to obtain color spatial distributions on an output surface 116 and/or a back surface 114 of a lightguide 110; and/or (3) to reduce glare exhibited by an edge-lit panel 100 by creating a gradual luminance transition in its lightguide 110, for instance, from a bright light source to a dark background.

Some embodiments may be implemented to design surface textures of light extraction features 140 for lightguides 110 customized for a given application or end use based on: (1) design constraints (e.g., size, weight, heat output, etc.); and/or (2) photometric criteria (e.g., luminous flux, luminous intensity, illuminance, luminance, etc.). Thus, as will be appreciated in light of this disclosure, one or more embodiments of the present invention may be implemented, for example, to design a highly efficient edge-lit LED lighting fixture/panel which exhibits a suitable lit appearance (e.g., uniform/non-uniform luminance and color distribution) for a wide range of applications such as, but not limited to, office lighting, commercial lighting, signage lighting, and display backlighting. Other suitable uses will be apparent in light of this disclosure.

As will further be appreciated in light of this disclosure, some embodiments of the present invention may provide advantages/benefits such as, but not limited to: (1) an improvement in luminance and color uniformity (e.g., luminance and color distribution uniformity of greater than 65%; greater than 70%; greater than 75%; greater than 80%; etc.) as compared with conventional techniques, designs, and products; (2) high optical efficiency (e.g., greater than 65%; greater than 70%; greater than 75%; greater than 80%; greater than 85%; etc.) for various lighting applications (e.g., office lighting, commercial lighting, signage lighting, display backlighting, etc.); and/or (3) high system efficacy (e.g., in the range of about 100 LPW at steady state for a 2 ft.×2 ft. lighting fixture/panel).

Furthermore, some embodiments may be implemented to achieve a desired luminance and color distribution while simultaneously: (1) minimizing the total quantity of LED light sources 130 implemented to achieve the desired luminance/color distribution; (2) minimizing or otherwise reducing any resultant detriment to the optical efficiency of a lighting fixture/panel 100 including a lightguide 110 which implements a surface texture configured in accordance with an embodiment of the present invention; and/or (3) reducing the cost associated with the design of a given lighting fixture/panel 100. Other advantages/benefits of various embodiments of the present invention will be apparent in light of this disclosure.

Methodology

Figure 3:
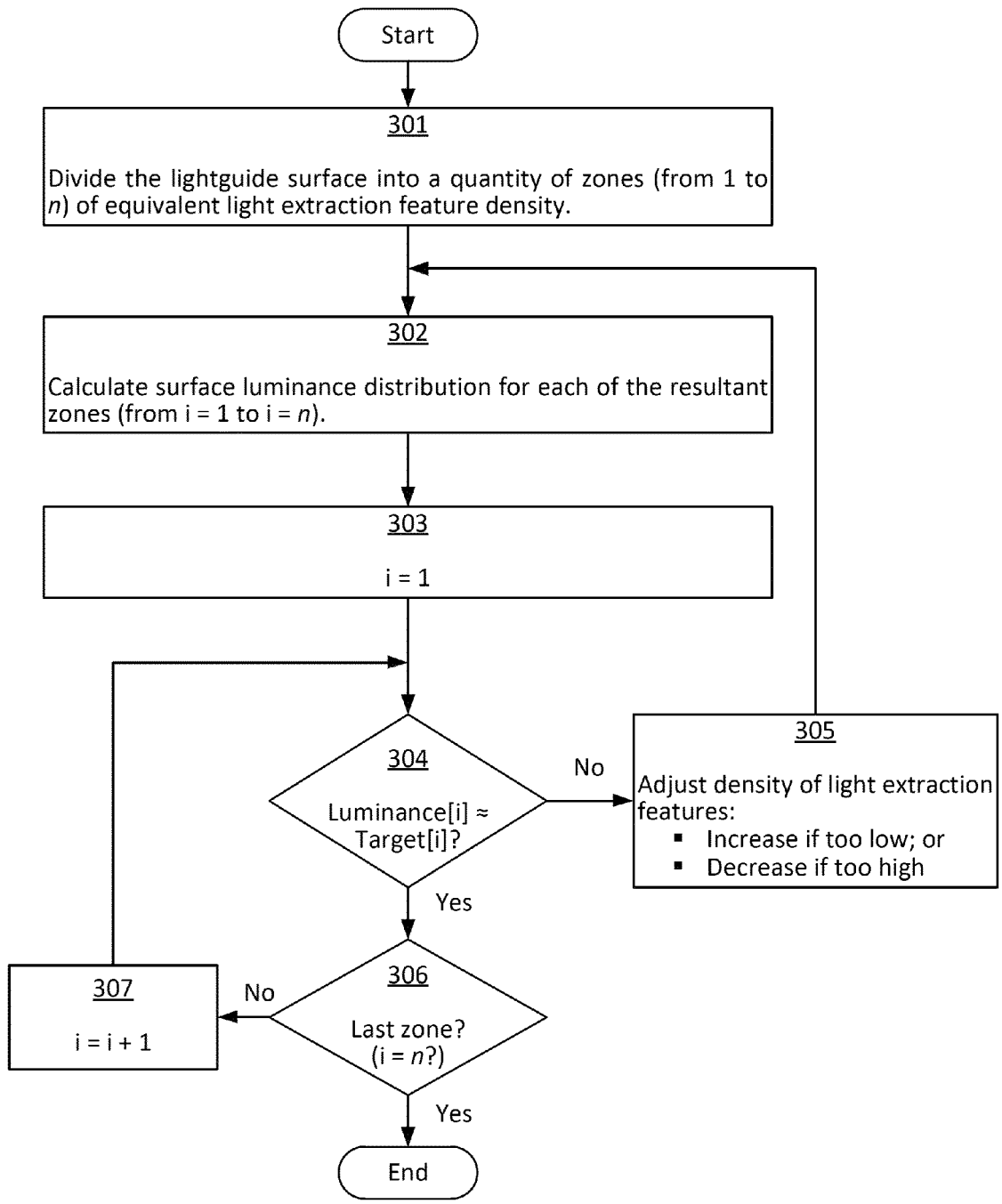
FIG. 3 is a flow diagram illustrating an iteration algorithm for designing a specific non-uniform surface texture to achieve a desired luminance distribution for a given lightguide in accordance with an embodiment of the present invention.

FIG. 3 is a flow diagram illustrating an iteration algorithm for designing a specific non-uniform surface texture to achieve a desired luminance distribution for a given lightguide 110 in accordance with an embodiment of the present invention. The iteration algorithm of FIG. 3 may be implemented, for example, to customize a given lightguide 110 surface texture to achieve a desired uniform and/or intentionally non-uniform luminance distribution in a single dimension and/or in multiple dimensions (e.g., two or more dimensions simultaneously). Furthermore, as will be appreciated in light of this disclosure, and in accordance with an embodiment, the disclosed algorithm can be implemented with any given lightguide 110 independently of how LED light sources 130 are operatively coupled therewith. For example, the disclosed techniques can be implemented with: (1) edge-lit lightguides 110 (e.g., LED light sources 130 are on an edge/side of lightguide 110); (2) bottom-lit lightguides 110 (e.g., LED light sources 130 are on the bottom of lightguide 110 and configured to couple light therein by a reflector); and/or (3) hybrid lightguides (e.g., LED light sources 130 are embedded into lightguide 110 and configured to couple light directly therein). Numerous suitable lightguide implementations can be used in conjunction with the disclosed iteration algorithm, as will be apparent in light of this disclosure.

Turning now to the algorithm of FIG. 3, as in block 301, the lightguide surface is divided into a plurality of zones (from 1 to n). In some cases, such division may be performed assuming that the lightguide surface initially has: (1) a spatially uniform surface texture (e.g., all zones from zone 1 to zone n have equivalent light extraction feature density); or (2) a spatially non-uniform surface texture (e.g., not all zones from zone 1 to zone n are of equivalent light extraction feature density). Thereafter, as in block 302, the luminance distribution is calculated for each of the resultant zones (e.g., from zones 1 to n).

Next, beginning with the first zone (i=1), as in block 303, the calculated luminance distribution for zone 1 is compared against the target luminance density for zone 1, as in block 304. The target luminance is defined as the ratio between the design luminous flux of a given zone and the total luminous flux of the entire lighting fixture. If the calculated luminance distribution for zone 1 is within an acceptable tolerance (e.g., ±10%, ±5%, ±2%, etc.) of the target luminance density for zone 1, then keep/retain the surface texture of that zone 1 and proceed to block 306 of the algorithm. However, if the calculated luminance distribution for zone 1 is not within an acceptable tolerance of the target luminance density for zone 1, then proceed to block 305 of the algorithm and adjust the density of the light extraction features within zone 1.

To this end, if the calculated luminance distribution for zone 1 is less than the target luminance density, then increase the density of light extraction features within zone 1. Conversely, if the calculated luminance distribution for zone 1 is greater than the target luminance density, then decrease the density of light extraction features within zone 1. After making the appropriate adjustment to the density of light extraction features within zone 1, return to block 302 and continue with the algorithm.

Whenever a zone density is adjusted (e.g., increased or reduced), a new luminance calculation is needed until the luminance value for all zones 1 to n meet the target luminance. Any time it is determined that the calculated luminance distribution for a given zone is within an acceptable tolerance of the target luminance density for that zone, it should be determined, as in block 306, whether the final zone n has been compared. If the current zone is not the final zone n, then proceed as in block 307 with the next zone (i=i+1) and return to block 304 and similarly apply the algorithm as previously discussed above in the context of that new zone. Otherwise, if the current zone is the final zone n, then the iteration algorithm may be terminated.

With regard to block 305, adjustments to the density of light extraction features 140 of a given surface (e.g., back surface 114 and/or output surface 116) of lightguide 110 may be achieved by making changes to one or more of a number of variables including, but not limited to: (1) the geometry/shape of a given light extraction feature 140; (2) the dimensions of a given light extraction feature 140; (3) the total quantity of light extraction features 140; and/or (4) the spatial distribution of the light extraction features 140 on a given surface (e.g., back surface 114 and/or output surface 116) of lightguide 110. As will be appreciated in light of this disclosure, and in accordance with an embodiment, alteration/adjustment of one or more of such factors may be performed to change the TIR conditions within lightguide 110 and thus achieve a desired uniform/non-uniform luminance distribution on a given surface thereof (e.g., output surface 116). Other factors/parameters of light extraction features 140 which may be tuned to achieve a desired uniform/non-uniform luminance distribution will depend on a given application and will be apparent in light of this disclosure.

As will be appreciated in light of this disclosure, luminance distribution for a given lightguide 110 may depend on a number of factors, including, but not limited to: (1) the type of LED light source 130; (2) the coupling into lightguide 110 of the light provided by LED light source 130; (3) the geometry and/or structure of lightguide 110; and/or (4) the configuration of an optionally included back reflector 120. Thus, as will further be appreciated in light of this disclosure, a given lightguide surface texture which yields a suitable luminance distribution in the context of one specific example application may not necessarily function suitably for a different application when one or more of such factors are changed. Therefore, in accordance with an embodiment, the iteration algorithm described herein can be implemented to individually refine/customize a given lightguide surface texture to achieve a desired luminance distribution specific to a given application or end use.

Numerous variations on this algorithm will be apparent in light of this disclosure. For instance, while the above algorithm is discussed in terms of iterations based on luminance, the claimed invention is not so limited. In accordance with an embodiment, iteration feedback may be provided by a wide variety of light distribution parameters including, but not limited to, one or a combination of spatial distribution and/or angular distribution, for example, of luminance, illuminance, luminous intensity, color, color temperature, color rendering index (CRI), or other light properties, at near-field and/or far-field.

As will be further appreciated in light of this disclosure, the multiple-zone representation can be made so as to, in one example embodiment, provide readily discernible zones of differing light extraction pattern (e.g., such that a plurality of laterally and/or longitudinally neighboring features in that zone are the same so as to provide an overall two dimensional quality to the zone), while in another example embodiment the multiple-zone representation may be made to provide a continuously varying light extraction pattern (e.g., such that each feature is different from a laterally and/or longitudinally neighboring feature so as to provide an overall one dimensional quality to the zone). For example, with a relatively low quantity of zones (e.g., 2-20 zones), the configuration of light extraction features 140 may have a coarser, step-like solution and the differences of each zone may be more noticeable. Conversely, with a relatively high quantity of zones (e.g., 21-200 zones, or greater), the configuration may have a smoother, more continuous solution and the differences of each zone may be more subtle. In a more general sense, the number of zones does not prevent using a continuously varying light extraction pattern. For instance, one can use just one zone with varying light extraction pattern, to achieve a desired lighting result, wherein one or more light extraction features within that zone are different from other features within that zone. Whether a coarse, step-like solution or a fine, continuously changing solution, a plurality of zones having differing light extraction features is provided. Further note that the light extraction features need not be placed with any particular relationship to one another. For instance, in one example embodiment, the light extraction features can be formed in a grid pattern that has rows and columns of extraction features. Another embodiment may be configured with a more random or otherwise irregular placement of light extraction features such that there are no consistent rows and/or columns. In addition, a zone may include any number of like light extraction features (one or more like extraction features per zone) or a plurality of two or more light extraction features that collectively are different from the light extraction features of other zones, in some embodiments. For instance, in one embodiment, a first zone may have a single light extraction feature of type A, and a second zone may have a plurality of light extraction features of type B. In another embodiment, a first zone may have light extraction feature types A and B, and a second zone may have light extraction feature types A and C. Any number of configurations of differing light extraction feature types can be made.

In accordance with an embodiment, each of the functional boxes and decision points shown in FIG. 3 can be implemented, for example, as a module or sub-module that, when executed by one or more processors or otherwise operated, causes the associated functionality as described herein to be carried out. The modules may be implemented, for instance, in software (e.g., executable instructions stored on one or more computer readable media), firmware (e.g., embedded routines of a microcontroller), and/or hardware (e.g., gate level logic or purpose-built silicon).

Example Structure and Simulated Implementation Data

FIG. 4 is a perspective view of a lightguide 110' configured with a non-uniform distribution of light extraction features 140 in accordance with an embodiment of the present invention. In some cases, the lightguide 110' can be edge-lit, but other embodiments may have other surfaces coupled to a light source, as will be appreciated in light of this disclosure. As can be seen, lightguide 110' has been divided into Zones 1 through 8 (e.g., n=8). In this example case, each of Zones 1 through 8 has an associated: (1) surface texture characteristic with respect to, for example, composition, size, shape, and/or density of light extraction features 140; (2) calculated luminance; and (3) target luminance (e.g., defined as the ratio between the design luminous flux of a given zone and the total luminous flux of the entire lighting fixture). As will be appreciated, some zones may have the same surface texture characteristic (light extraction features 140) as one or more other zones, or all zones can be configured with different surface texture characteristics (light extraction features 140). Depending on the application, some zones may not have any light extraction features 140. In addition, each zone, or a sub-set of zones, may have light extraction features 140 having, for example, a different composition, size, density, and/or shape relative to light extraction features 140 of other zones.

For applications requiring, for example, a uniform luminance distribution, the target luminance value may be 1/n of the lighting fixture's total luminous flux for all zones from 1 to n. For instance, if lightguide 110' has 8 zones (n=8), then the target luminance value is ⅛ for each of Zones 1 through 8. However, for applications requiring a non-uniform luminance distribution, the target luminance may be different from the aforementioned 1/n distribution. For instance, if there are 8 zones (n=8), then the target luminance values for each of Zones 1 through 8 may be, for example, $$\frac{1}{32}, \frac{1}{16},$$

⅛, $$\frac{9}{32}, \frac{9}{32},$$

⅛, $$\frac{1}{16}, \text{ and } \frac{1}{32},$$

respectively, of the lighting fixture's total luminous flux. As will be appreciated in light of this disclosure, these example target luminance values are included here for illustrative purposes only, and the claimed invention is not intended to be limited to those example values. Other suitable target luminance values for all zones from 1 to n will depend on the specifics of a given application.

Figure 5A:
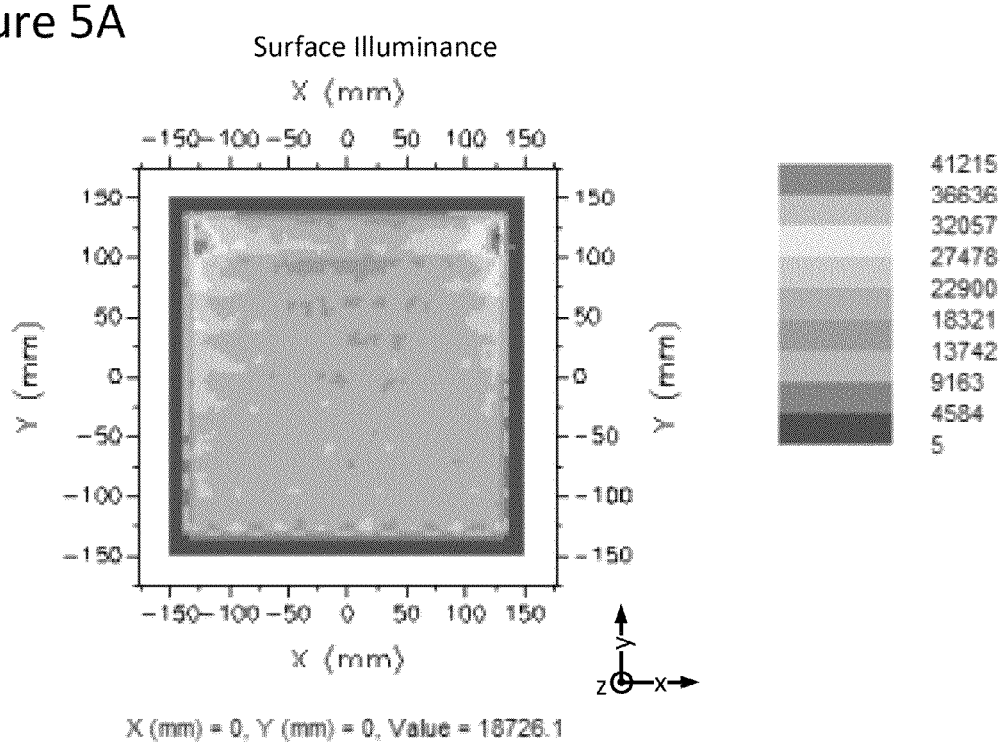
FIG. 5A is a simulated two-dimensional mapping of surface illuminance of a lightguide configured with a non-uniform distribution of light extraction features in accordance with an embodiment of the present invention.
Figure 5B:
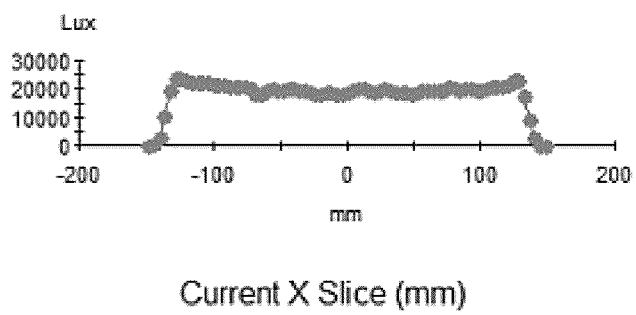
FIG. 5B is a current slice graph showing illuminance as a function of location along the X-direction of the simulated two-dimensional mapping of FIG. 5A.

FIG. 5A is a simulated two-dimensional mapping of surface illuminance of a lightguide 110' configured with a non-uniform distribution of light extraction features in accordance with an embodiment of the present invention. FIG. 5B is a current slice graph showing illuminance as a function of location along the X-direction of the simulated two-dimensional mapping of FIG. 5A, and FIG. 5C is a current slice graph showing illuminance as a function of location along the Y-direction of the simulated two-dimensional mapping of FIG. 5A.

Figure 5C:
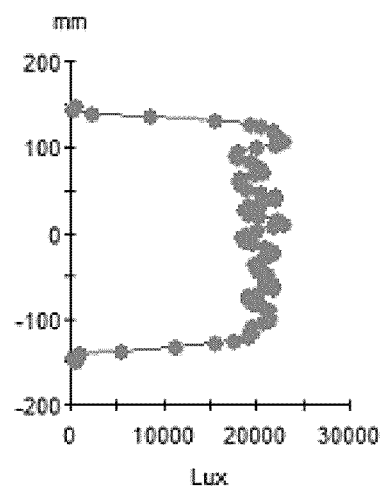
FIG. 5C is a current slice graph showing illuminance as a function of location along the Y-direction of the simulated two-dimensional mapping of FIG. 5A.

The simulated data depicted in FIGS. 5A-5C effectively show that the disclosed iteration algorithm may be implemented, in accordance with an embodiment, to produce a lightguide surface texture which achieves, as desired, a luminance distribution (in one or more directions) having: (1) a high optical efficiency (e.g., about 65% or greater; about 70% or greater; about 75% or greater; about 80% or greater; about 85% or greater; etc.); and/or (2) high uniformity (e.g., about 65% or greater; about 70% or greater; about 75% or greater; about 80% or greater; etc.). While the example embodiment shown in FIGS. 5A-5C demonstrates achievement of a desired uniform/non-uniform luminance distribution, the claimed invention is not so limited; for instance, as will be appreciated in light of this disclosure, and in accordance with an embodiment, techniques disclosed herein may be implemented to produce a lightguide surface texture which achieves, as desired, a color distribution (in one or more directions) having high optical efficiency and/or high uniformity. As will further be appreciated in light of this disclosure, and in accordance with an embodiment, the observed deviations in luminance distribution uniformity (e.g., seen as bright/hot spots in the upper left and right corners of the chart of FIG. 5A) may be improved, for example, by implementing the iteration algorithm in another direction (e.g., in the X-direction).

Numerous embodiments will be apparent in light of this disclosure. One example embodiment of the present invention provides a lightguide device including an input surface configured to receive light from a light source and at least one surface having a surface texture comprising a plurality of light extraction features configured to direct incident light out of the lightguide device, wherein the surface texture is divided into a plurality of zones including a first and a second zone, the first zone having light extraction features configured differently than light extraction features of the second zone, such that light is extracted from the first zone differently than from the second zone due to the difference in their corresponding light extraction features. In some cases, a density of the light extraction features of the first zone is different than a density of the light extraction features of the second zone. In some other cases, a composition of the light extraction features of the first zone is different from a composition of the light extraction features of the second zone. In some other instances, the light extraction features of the first zone are of a different size than the light extraction features of the second zone. In some cases, the light extraction features of the first zone are of a different shape than the light extraction features of the second zone. In some instances, the lightguide further includes one or more additional zones of light extraction features. In some such cases, each of the one or more additional zones of light extraction features is configured uniquely with respect to the other zones. In some cases, the plurality of zones provides a continuously varying light extraction pattern. In other cases, the plurality of zones provides a stepped light extraction pattern. Other cases may include both a plurality of zones that provides a continuously varying light extraction pattern and a plurality of zones that provides a stepped light extraction pattern. Numerous such variations are possible.

Another example embodiment of the present invention provides a method of designing a lightguide device, the method including dividing a lightguide surface having an initial distribution of light extraction features into a plurality of zones including a first and a second zone and adjusting the light extraction features of the first zone differently than the light extraction features of the second zone, such that light will be extracted from the first zone differently than from the second zone due to the difference in their corresponding light extraction features. In some cases, adjusting the light extraction features of the first zone differently than the light extraction features of the second zone includes calculating a light distribution parameter for the first zone, comparing the resultant calculated light distribution parameter for the first zone to a target light distribution parameter for the first zone, and adjusting the light extraction features of the first zone until the light distribution parameter for the first zone is within a given tolerance of the target light distribution parameter for the first zone. In some instances, the light distribution parameter comprises spatial and/or angular distribution of at least one of luminance, illuminance, luminous intensity, color, color temperature, and/or color rendering index (CRI). In some such cases, the light distribution parameter for the first zone is different than a light distribution parameter for the second zone. In some other such cases, adjusting the light extraction features of the first zone differently than the light extraction features of the second zone further includes increasing light extraction feature density for the first zone if the calculated light distribution parameter is lower than the target light distribution parameter for the first zone or decreasing light extraction feature density for the first zone if the calculated light distribution parameter is higher than the target light distribution parameter for the first zone. In some other such cases, the method further includes repeating the calculating, comparing, and adjusting for the second zone. In some instances, a density of the light extraction features of the first zone is different than a density of the light extraction features of the second zone. In some other instances, a composition of the light extraction features of the first zone is different than a composition of the light extraction features of the second zone. In some other instances, the light extraction features of the first zone are of a different size than the light extraction features of the second zone. In some other cases, the light extraction features of the first zone are of a different shape than the light extraction features of the second zone. In some other cases, the plurality of zones further includes one or more additional zones of light extraction features. In some such cases, each of the one or more additional zones of light extraction features is configured uniquely with respect to the other zones. In some cases, the plurality of zones provides a continuously varying light extraction pattern (e.g., as opposed to a stepped light extraction pattern).

Yet another example embodiment of the present invention provides a lighting device including one or more light sources configured to emit light and a lightguide comprising an input surface configured to receive light from the one or more light sources and at least one surface having a surface texture comprising a plurality of light extraction features configured to direct incident light out of the lightguide, wherein the surface texture is divided into a plurality of zones including a first and a second zone, the first zone having light extraction features configured differently than light extraction features of the second zone, such that light is extracted from the first zone differently than from the second zone due to the difference in their corresponding light extraction features. In some cases, the lighting device has an optical efficiency of greater than or equal to about 80%. In some other cases, the lighting device further includes a back reflector operatively coupled to the lightguide and configured to ensure that substantially all of the light received by the lightguide is directed out of a single output surface of the lightguide. In some cases, the plurality of zones provides a continuously varying light extraction pattern.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of designing a lightguide device comprising:
    dividing a lightguide surface having an initial distribution of light extraction features into a plurality of zones including a first and a second zone; and
    adjusting the light extraction features of the first zone differently than the light extraction features of the second zone, such that light will be extracted from the first zone differently than from the second zone due to the difference in their corresponding light extraction features.

2. The method of claim 1, wherein adjusting the light extraction features of the first zone differently than the light extraction features of the second zone comprises:
    calculating a light distribution parameter for the first zone;
    comparing the resultant calculated light distribution parameter for the first zone to a target light distribution parameter for the first zone; and
    adjusting the light extraction features of the first zone until the light distribution parameter for the first zone is within a given tolerance of the target light distribution parameter for the first zone.

3. The method of claim 2, wherein the light distribution parameter comprises spatial and/or angular distribution of at least one of luminance, illuminance, luminous intensity, color, color temperature, and/or color rendering index (CRI).

4. The method of claim 2, wherein the light distribution parameter for the first zone is different than a light distribution parameter for the second zone.

5. The method of claim 2, wherein adjusting the light extraction features of the first zone differently than the light extraction features of the second zone further comprises:
    increasing light extraction feature density for the first zone if the calculated light distribution parameter is lower than the target light distribution parameter for the first zone; or
    decreasing light extraction feature density for the first zone if the calculated light distribution parameter is higher than the target light distribution parameter for the first zone.

6. The method of claim 2 further comprising repeating the calculating, comparing, and adjusting for the second zone.

7. The method of claim 1, wherein a density of the light extraction features of the first zone is different than a density of the light extraction features of the second zone.

8. The method of claim 1, wherein a composition of the light extraction features of the first zone is different than a composition of the light extraction features of the second zone.

9. The method of claim 1, wherein the light extraction features of the first zone are of a different size than the light extraction features of the second zone.

10. The method of claim 1, wherein the light extraction features of the first zone are of a different shape than the light extraction features of the second zone.

11. The method of claim 1, wherein the plurality of zones further comprises one or more additional zones of light extraction features each of which is configured uniquely with respect to the other zones.

12. The method of claim 1, wherein the plurality of zones provides a continuously varying light extraction pattern.

* * * * *